Nov. 10, 1970   L. D. GREENWOOD   3,539,271
METHOD AND APPARATUS FOR DEPOSITING LEAVES IN WINDROWS
Filed Nov. 12, 1968   4 Sheets-Sheet 1
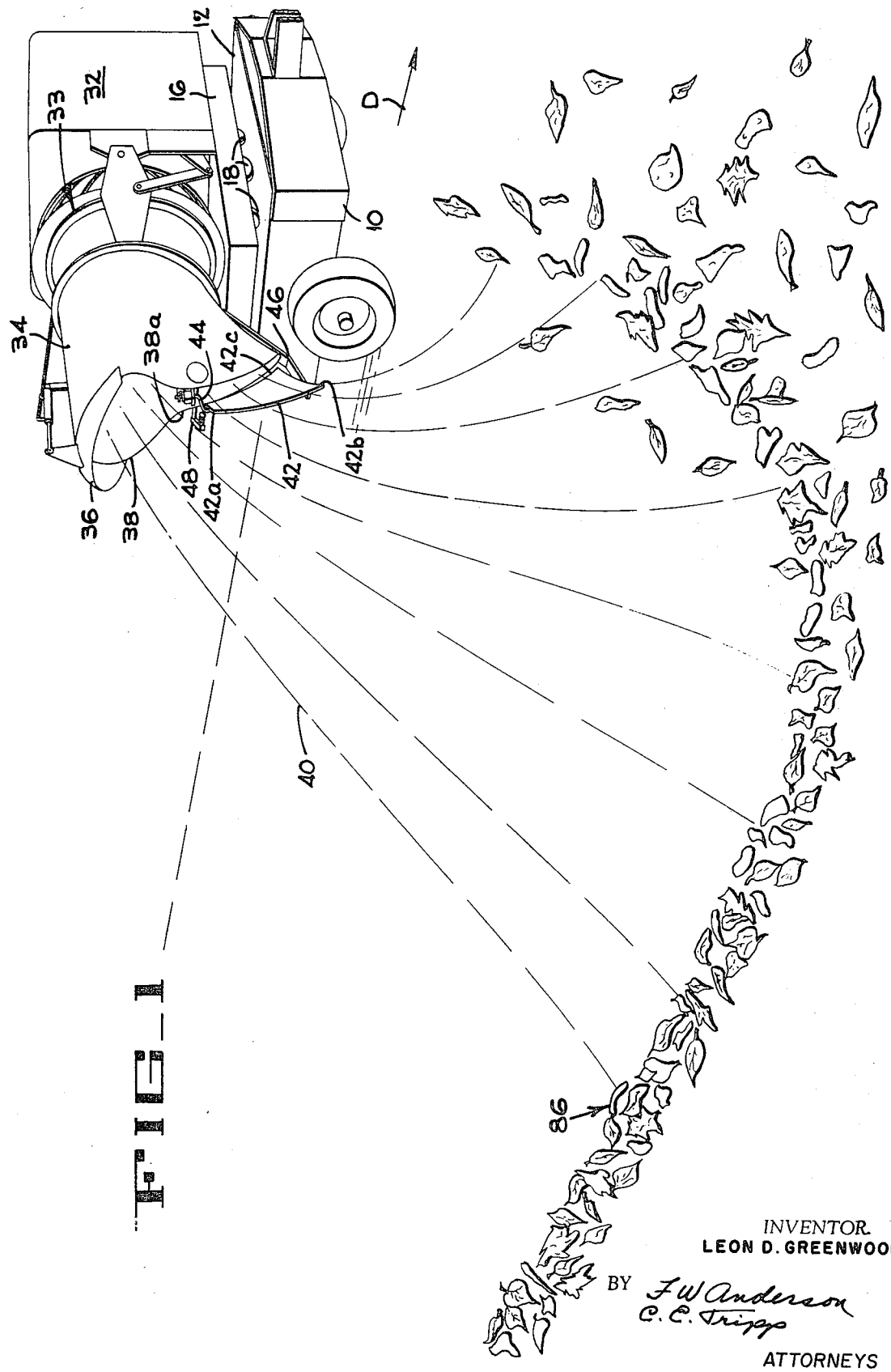
INVENTOR.
LEON D. GREENWOOD
BY F. W. Anderson
C. C. Trigg
ATTORNEYS

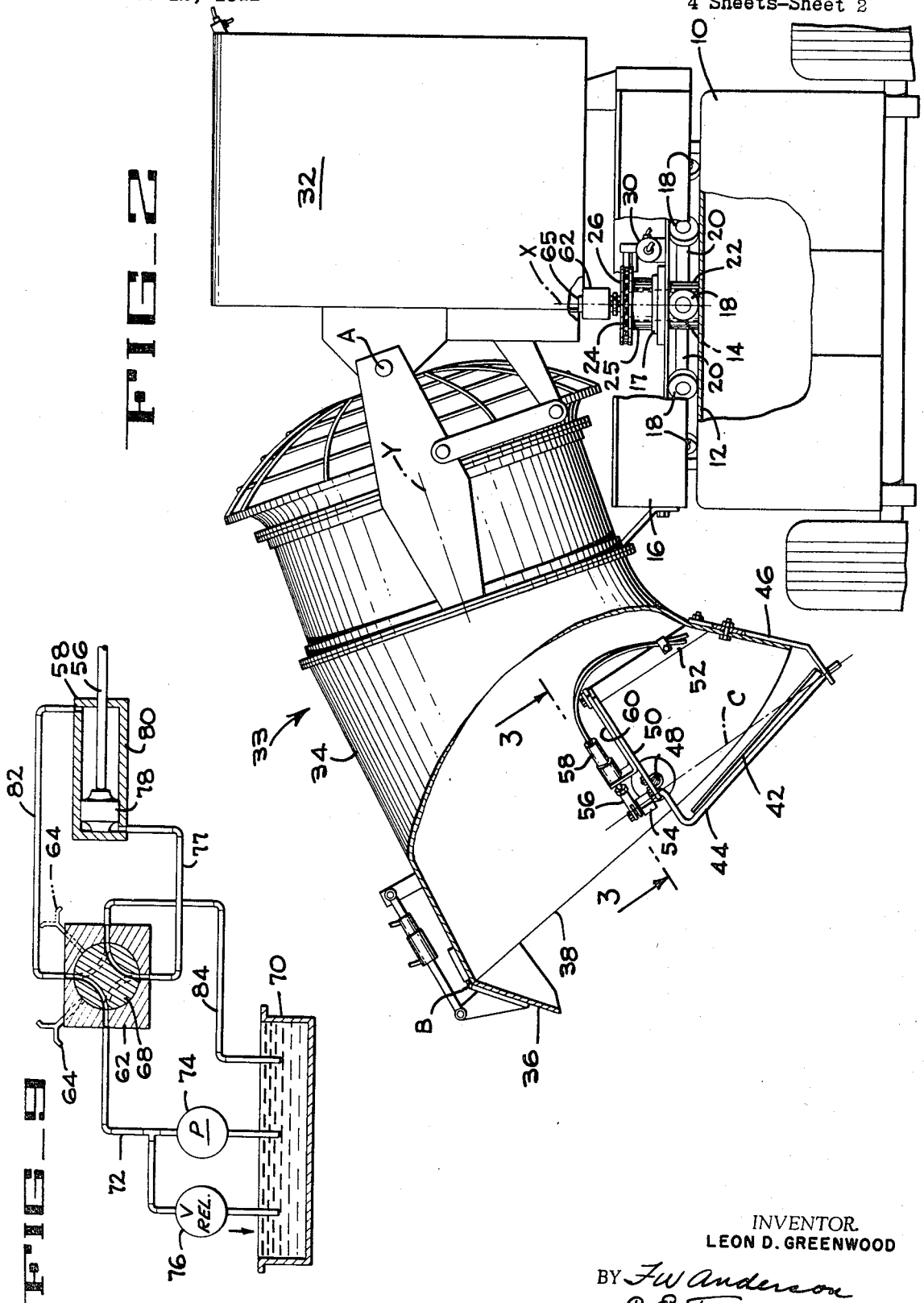

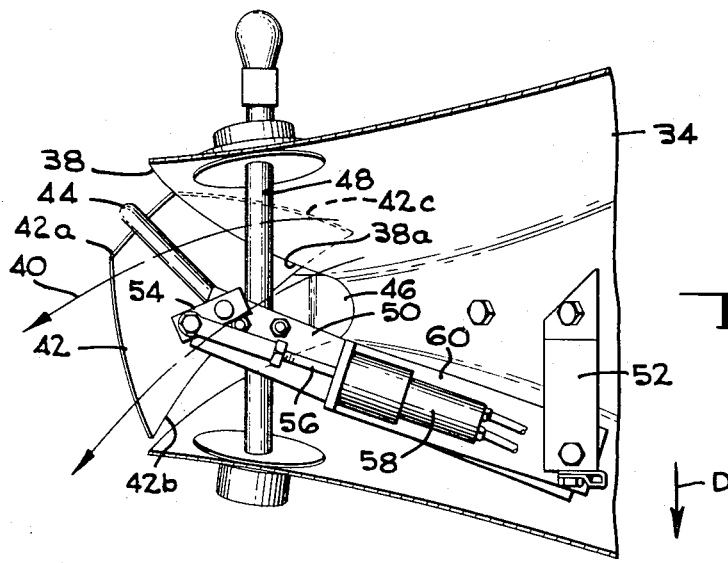
FIG_3
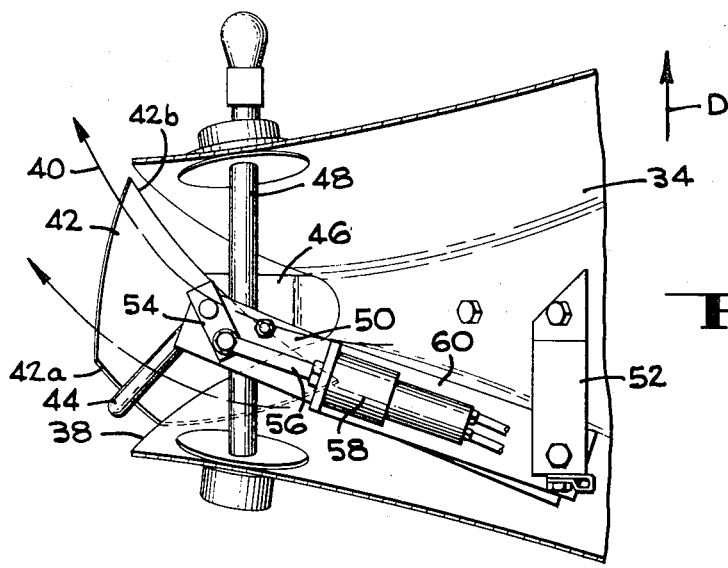
FIG_4

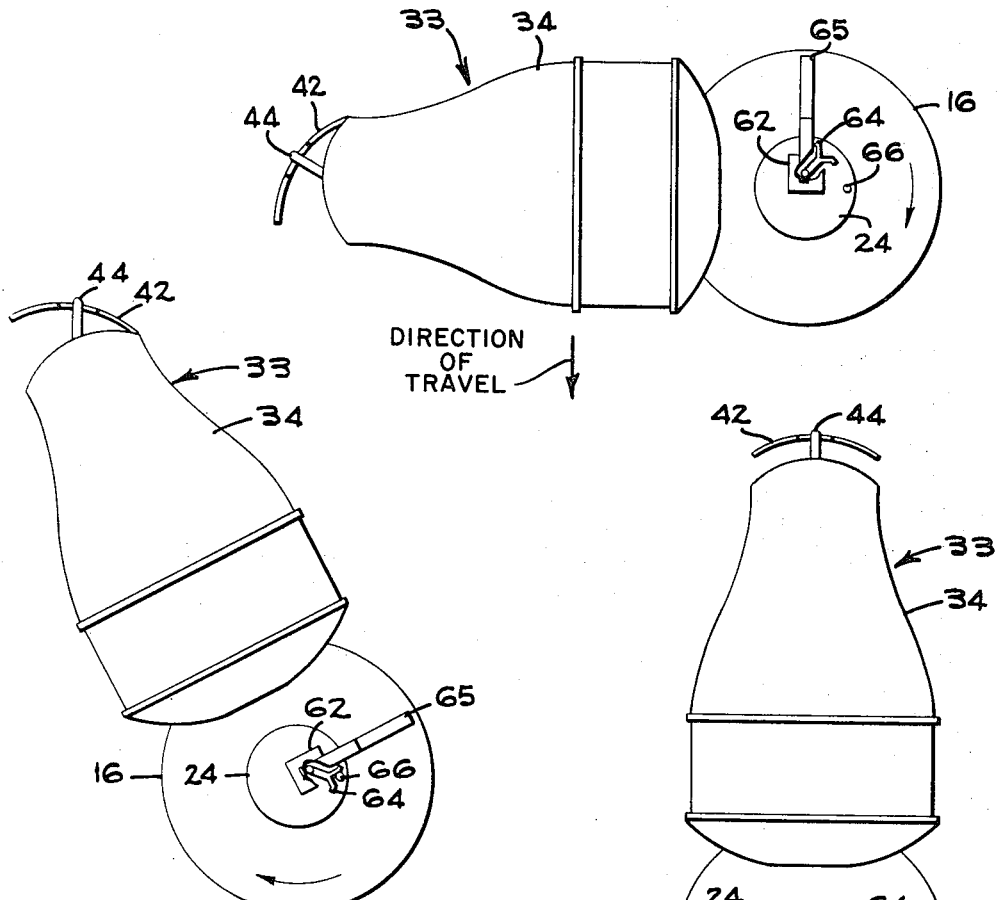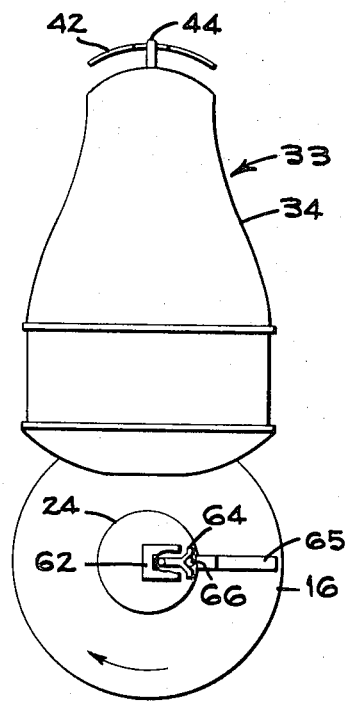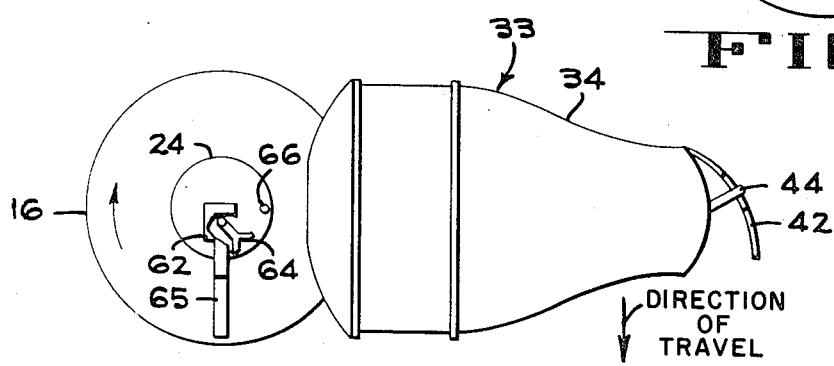

United States Patent Office 3,539,271
Patented Nov. 10, 1970

3,539,271
METHOD AND APPARATUS FOR DEPOSITING LEAVES IN WINDROWS
Leon D. Greenwood, Lansing, Mich., assignor to FMC Corporation, San Jose, Calif., a corporation of Delaware
Filed Nov. 12, 1968, Ser. No. 774,730
Int. Cl. A01n *17/08;* F04d *29/44*
U.S. Cl. 415—1                        14 Claims

ABSTRACT OF THE DISCLOSURE

A blower to pile leaves in windrows is mounted on a carriage and includes an impeller housing having an impeller therein to generate a stream of air. The impeller housing is rotatable on the carriage about a vertical axis and is pivotal with respect thereto. The carriage moves along a path with the impeller housing directed generally perpendicular to the path. A baffle in the lower portion of the housing opening diverts the lower portion of the airstream in descending progression in an increasing forwardly direction so that leaves close to the machine are not passed over and blown rearwardly short of the windrow.

BACKGROUND OF THE INVENTION

The present invention relates to apparatus for blowing leaves into windrows.

Typical apparatus for piling leaves in windrows includes a blower mounted on a carriage which moves along a path parallel to the desired windrow. The blower has an impeller housing with an impeller mounted therein to discharge a stream of air from an opening in the impeller housing. The stream of air is discharged in a direction perpendicular to the direction of travel of the carriage, or somewhat forward of that perpendicular.

Machines designed specifically for leaf blowing usually have the air outlet very close to the ground so that leaf removal will start close to the machine. All air is discharged essentially parallel to the ground and a large portion of the air pattern comes into contact with the ground. Friction losses are high.

Larger machines usually have the air outlet mounted several feet above the ground. The discharge pattern of many of these units is that of an ordinary air jet which is basically one of unidirectional flow. When such an air pattern is aimed for maximum carry, leaves are missed in the first (approximately ⅓) part of the swath. The swath can be defined as the area traversed by a line perpendicular to path of travel, extending from the centerline of the unit to the point of maximum effective reach of the air pattern. This type of leaf blower is effective in blowing the more remote leaves into a windrow spaced from and parallel to the path of the carriage. Such machines often require continual vertical repositioning of the blower to move both the close and remote leaves. Gross movement of the air stream in this manner, reduces substantially the mechanical efficiency of the air jet since any motion of the air jet relative to the surrounding air mass, saps additional energy by accelerating additional mass.

Machines with a proportioned air outlet of the type used for broadcast spraying of turf and crops (such as shown in U.S. Pats. 3,252,656 and 3,403,856) are somewhat more effective leaf blowers since they do not have the functional inefficiencies previously mentioned. Sprayers depend on air displacement within the plant foliage or other target material and direction of the air stream at the various portions of the swath has not been critical. When this type of equipment is used for leaf blowing, however, leaves close to the machine tend not to be lifted off the ground because the downward angle of the airstream is too steep close to the machine. Instead, the leaves are urged downwardly, and scattered in many directions, including the rearward direction. Leaves escaping behind the blower from a position close to the path of the blower will not be deposited in the windrow. The steep angle of the airstream is not too important at low ground speeds since nearly half of the most downwardly directed air is deflected to have some forward component. At higher speeds, less air is deflected forward due to the reaction of relatively static surface air. Further, at higher ground travel speeds, the nearest leaves are exposed to a much shorter duration of air flow that has a forward component. Once leaves are passed over by this functional portion of the air pattern, they will not be delivered to the windrow.

SUMMARY OF THE INVENTION

The present invention relates to depositing leaves in windrows by a leaf blower of the type in which a stream of air is directed laterally with respect to the direction of travel of the blower. In the present invention, at least the lower portion of the air stream is directed in a forwardly direction to prevent leaves from escaping rearwardly from the stream of air before they are blown laterally by the stream of air into a windrow. Preferably, the lowermost portion of the air stream, which must capture the leaves closest to the path of the blower, blows the leaves in the most forwardly direction (at an angle of about 45° from the perpendicular to the path of travel of the blower). Since the air stream fans out as it progresses away from the blower, the leaves closest to the blower are exposed to the airstream for a lesser extent of time than the more remote leaves. Consequently, blowing the closer leaves in a more forwardly direction minimizes the chances of the closer leaves escaping the stream of air before they are blown into a windrow.

In the preferred form of the invention, a baffle is mounted in the lower portion of the air discharge opening of the blower housing. The baffle, which is mounted for pivotal movement around a generally upright axis, is wider at the bottom than the top to divert the air striking the bottom of the baffle in a more forwardly direction. A power actuator is provided to adjust the position of the baffle. If the blower is rotated 180° with respect to the carriage on which it is mounted, the baffle will be shifted automatically from one side of the air discharge opening to the other so that the lower portion of the airstream will continue to be blown forwardly.

It is therefore an object of the present invention to provide a method and apparatus for blowing leaves into windrows at high rates without missing a significant number of leaves. It is another object of the present invention to provide a method of and apparatus for a leaf blower which effectively picks up leaves close to the path of the blower.

BRIEF DESCRIPTION OF THE DRAWINGS

FIG. 1 is a view in perspective of a leaf blower constructed in accordance with the present invention, showing the path of the leaves blown thereby;

FIG. 2 is an enlarged side view of the leaf blower of FIG. 1;

FIG. 3 is a view taken on the line 3—3 except that the baffle is shown in one extreme position;

FIG. 4 is a view similar to FIG. 3 except that the baffle is shown in the extreme position opposite to the position of FIG. 3;

FIGS. 5, 6, 7 and 8 are schematic views showing actuation of the switch to shift the baffle from one extreme position to the other; and FIG. 9 is a schematic diagram of the hydraulic circuit for shifting the baffle from one extreme position to the other.

DESCRIPTION OF THE PREFERRED EMBODIMENT

As shown in FIG. 1, a wheeled carriage 10 has a base plate 12 (see FIG. 2) with an upstanding post 14 mounted thereon. A turntable 16 has a bearing 17 secured thereon which is rotatably received over post 14, and the turntable is supported on base plate 12 by rollers 18. The rollers 18 are rotatably received on spokes 20 which radiate from a hub 22 rotatably received on post 14. A sprocket 24 has a sleeve 25 secured thereto which is keyed on post 14 above bearing 17. Sprocket 24 receives a chain 26 which is connected to a double acting ram 30. The ram 30 is mounted in the turntable so that actuation of the ram, in one direction or the other by a control valve (not shown) rotates the turntable about a vertical axis X in one direction or the other, through an angle of over 100 degrees in each direction.

A gasoline engine is mounted in an engine housing 32 on the turntable and is connected to the impeller (not shown) of a blower 33 in the same manner as the impeller is connected to the engine in U.S. Pat. 3,403,856 of L. D. Greenwood, which is incorporated by reference into the present disclosure. The impeller is mounted on axis Y in a blower housing 34 which is pivotally connected to the engine housing for swinging movement in a vertical plane about the horizontal axis A in the same manner as the blower housing in the above patent. This swinging movement of the blower housing is effected by remote control to position the housing for directing a stream of air between an angle of 45 degrees upward and 20 degrees downward with respect to the horizontal. The blower housing has a deflecting vane, or baffle, 36 mounted on the upper surface to pivot about a horizontal axis B for further adjustment of the air stream in the vertical plane. The baffle 36 is remotely controlled as described in the above patent.

The blower housing 34 has a discharge opening 38 at the outer end of the housing through which a stream of air 40 (FIG. 1) from the impeller is discharged. A baffle 42 is mounted at the lower portion of the discharge opening 38. Baffle 42 is secured to a support rod 44 which has a lower end pivotally received in a strap 46 connected to the bottom of blower housing 34. The blower housing has a throat adjusting mechanism 48 described in the U.S. Pat. 3,252,656 of L. D. Greenwood, which is incorporated by reference into the present disclosure. The upper end of rod 44, which has a double bend, is pivotally received in a strap 50. The strap 50 is secured at the outer end to throat adjusting mechanism 48 and at the inner end to an upright support 52. As shown best in FIGS. 3 and 4, a crank block 54 is secured at one end on the upper end of rod 44 above strap 50. The opposite end of the crank block is pivotally connected to the piston rod 56 of a double acting ram 58 (see FIG. 9). Ram 58 is secured to a bracket 60 which is pivotally mounted on strap 50 to turn the crank block through an angle of 90 degrees about the upright axis C extending through the pivotal connections of the upper and lower ends of support rod 44. Thus, by operation of ram 58, the baffle 42 can be turned from one extreme position (shown in FIG. 3) in one side of the lower portion of discharge opening 38 through 90 degrees to the other extreme position (shown in FIG. 4) in the other side of the lower portion of discharge opening 38.

As shown in FIG. 2 and in FIGS. 5 to 8, a valve 62, having an actuating arm 64, is mounted by bracket 65 on the turntable 16 with the arm 64 in the path of a stationary operating pin 66 which is mounted on sprocket 24. The valve 62 has a rotatable core 68 (see FIG. 9) to which the actuating arm 64 is connected, and the core 68 is rotated 90 degrees as the valve rotates with the turntable from the position shown in FIG. 5 to the position shown in FIG. 8. FIG. 6 shows how the bifurcated end of the valve actuating arm first engages pin 66 and FIG. 7 shows how the valve actuating arm is actuated by the pin 66.

As shown in FIG. 9, hydraulic fluid from a source tank 70 is pumped into line 72 under pressure by pump 74, a relief valve 76 being provided to return fluid from line 72 to tank 70 when a desired pressure in line 72 is exceeded. When the actuating arm 64 and rotary core 68 of the valve are in the positions shown in dotted lines in FIG. 9, fluid under pressure from line 72 is transmitted to motor line 77 to extend the piston 78 in the cylinder 80 of ram 58. Fluid in front of piston 78 is discharged through motor line 82, through valve core 68, to return line 84. At this time the valve 62 is in the position shown in FIG. 5, and the baffle 42 is in the extreme position shown in FIG. 3 (that is, in the trailing portion of the discharge opening with respect to the direction of blower travel indicated by arrow D in FIGS. 1, 3 and 5).

When the turntable is turned through 180 degrees, the valve arm is actuated by pin 66 (as shown in FIGS. 6 and 7), and when a 180-degree turn is completed, with the valve in the position shown in FIG. 8, the valve arm 64 and rotary core 68 will be in the position shown in solid lines in FIG. 9. With the valve core in this position, pressure fluid is transmitted to motor line 82 to retract piston 78. The retraction of piston 78 discharges fluid through motor line 77, through valve core 68, to return line 84. At this time, then, the baffle 42 will be in the position shown in FIG. 4 which is again in the trailing portion of the discharge opening 38 of the blower housing with respect to the direction of travel, indicated by arrow D, of the blower.

The baffle, as shown best in FIG. 1, is a slightly curved plate shaped as a symmetrical trapezoid, with a relatively narrow upper edge 42a and a relative wide lower edge 42b, the lower edge having, for example, a span of three or four times the upper edge. The radius of curvature of the plate is the same at the top and bottom of the plate, but, because of the greater width of the baffle at the bottom, the curvature at the bottom of the baffle plate will be greater than at the top. In other words, the top edge and bottom edge of the baffle have the same radius of curvature but the bottom edge describes a greater arc.

In windrowing leaves, the carriage 10 is connected to a vehicle for travel in the direction indicated by arrow D in FIG. 1. The turntable 16 is rotated until the blower 33 is pointed laterally with respect to the direction of travel (that is, perpendicular to the direction of travel of carriage 10). Valve 62, at this time, will be set to hold the connecting rod 56 of piston 78 extended, as shown in FIG. 3. The blower 33 is tilted slightly downward to direct the stream of air therefrom at an angle of, say, 5° below the horizontal.

With the baffle 42 in the lower portion of blower housing discharge opening 38, and with the inner, or trailing edge 42c thereof adjacent the trailing edge 38a of the blower housing, the baffle will extend into the airstream 40 as shown in FIG. 1. The lower edge of the baffle, which is wider than the upper edge, will extend further into the airstream than the upper edge to impart a greater curvature to the portion of the airstream striking the bottom portion of the baffle. Thus, the lowermost portion of the airstream will be directed forwardly at a greater angle, say 45°, from the perpendicular to the line of travel than the portion of the airstream engaging the upper portion of the baffle. The airstream portion passing the upper poriton of the baffle might, for example, extend forwardly at an angle of 30° from the perpendicular to the line of travel.

It can be seen from FIG. 1 that the upper portion of the airstream, which passes above baffle plate 42, is directed along the perpendicular to the line of travel and blows the leaves into a windrow 86. The air striking the baffle is diverted in descending progression in a more forwardly direction with the lowermost portion of the air stream diverted in the most forwardly direction. In other words, the direction of the air striking the baffle progressively increases in a more forwardly direction from the top of the baffle to the bottom so that leaves closest to the path of the blower are blown forwardly, the closest leaves being blown in the most forwardly direction.

Without the baffle 42, all air from blower 33 would be directed perpendicular to the path of travel of the blower. The upper portion of the stream, which strikes the earth at a relatively shallow angle, would blow the leaves outwardly in a satisfactory manner to form a windrow. But the lower portion of the airstream, which strikes the ground at a relatively steep angle, tends to blow the leaves into the ground and, consequently, scatters the leaves, forwardly, rearwardly and outwardly. When this occurs, the rearwardly scattered leaves escape the influence of the blower, and are not blown into the desired windrow.

With the apparatus of the present invention, the leaves more remote from the blower are blown directly into windrow 86, while the nearer leaves are blown forwardly and outwardly where they cannot escape the influence of the blower. As the blower advances, these forwardly blown leaves gradually more outwardly into the windrow 86 and the span of ground between the path of the blower and the windrow is blown clean.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for piling leaves in windrows, said apparatus movable forwardly along a path and having a blower directed laterally with respect to said path, said blower operable to generate a stream of air over the ground adjacent said apparatus to blow the leaves into piles, and a baffle means to divert the lower portion of the stream of air in a more forwardly direction than the upper portion of the stream of air.

2. The apparatus of claim 1 in which said baffle means has its greatest span at the bottom to divert the air in descending progression in a more forwardly direction with the lowermost portion of the airstream diverted in the most forwardly direction.

3. Apparatus for piling leaves in windrows, said apparatus including a wheeled frame movable forwardly along a path and having a blower mounted thereon, said blower having a housing with a discharge opening directed laterally with respect to said path, and a baffle mounted at the discharge opening, the lower portion of said baffle extending more fully across said opening than the upper portion thereof to divert air discharged from the lower portion of the housing more forwardly than the air discharged from the upper portion of the housing.

4. Apparatus for piling leaves in windrows comprising a wheeled frame movable along a path, a blower mounted on said frame, said blower having an impeller housing with a discharge opening and having an impeller mounted in the impeller housing to generate a stream of air for discharge from said discharge opening, said housing rotatable on the frame about a vertical axis, and a baffle means mounted at the discharge opening of said housing to deflect the lower portion only of said airstream in a forwardly direction when said housing is directed perpendicular to said path.

5. The apparatus of claim 4 in which an actuator is provided to turn said baffle means from side to side.

6. Apparatus for piling leaves in windrows comprising a wheeled frame movable along a path, a blower mounted on said frame, said blower having an impeller housing with a discharge opening and having an impeller mounted in the impeller housing to generate a stream of air for discharge from said discharge opening, said housing rotatable on the frame about a vertical axis and pivotal on the frame about a horizontal axis, and an adjustable baffle means mounted at the lower end of the discharge opening of the housing to deflect the lower portion only of said airstream in a forwardly direction when said housing is adjusted perpendicular to said path.

7. Apparatus for piling leaves in windrows, a wheeled frame movable along a path, a blower mounted on the frame and operable to discharge a stream of air, said blower directed laterally with respect to the direction of movement of the frame, and means to intercept only the lower portion of the airstream and divert said portion in a more increasingly forward direction.

8. A method of piling leaves in windrows with a blower comprising the steps of moving the blower along a path, discharging a stream of air laterally from said blower as the blower moves along said path, and diverting only the lower portion of said airstream in a forwardly direction.

9. A method of piling leaves in windrows with a blower comprising the steps of moving the blower along a path, discharging a stream of air laterally from said blower as the blower moves along said path, and diverting in descending progression only the lower portion of said airstream in an increasingly forward direction.

10. Apparatus for piling leaves in windrows, said apparatus including a wheeled frame movable along a path and having a blower mounted thereon, said blower having a housing directed laterally with respect to said path, and a baffle mounted at the lower portion of the housing to divert air discharged from the lower portion of the housing forwardly with respect to the air discharged from the upper portion of the housing, said baffle having in descending progression a greater reach into the airstream to divert the air in descending progression in a more forwardly direction.

11. Apparatus for piling leaves in windrows comprising a wheeled frame movable along a path, a blower mounted on said frame, said blower having an impeller housing with a discharge opening and having an impeller mounted in the impeller housing to generate a stream of air for discharge from said discharge opening, said housing rotatable on the frame about a vertical axis, and a baffle mounted at the discharge opening of said housing to deflect the lower portion of said airstream in a forwardly direction when said housing is directed perpendicular to said path, said baffle having a curved cross section and the bottom of said baffle having a greater curvature than the top to divert the air striking the bottom of the baffle in a more forwardly direction.

12. The apparatus of claim 11 in which the baffle has an outer edge and an inner edge and in which the inner edge of the baffle is positioned adjacent the trailing edge of the discharge opening relative to the direction of travel of the blower.

13. Apparatus for piling leaves in windrows comprising a wheeled frame movable along a path, a blower mounted on said frame, said blower having an impeller housing with a discharge opening and having an impeller mounted in the impeller housing to generate a stream of air for discharge from said discharge opening, said housing rotatable on the frame about a vertical axis and pivotal on the frame about a horizontal axis, and an adjustable baffle mounted at the lower end of the discharge opening of the housing to deflect the lower portion of said airstream in a forwardly direction when said housing is adjusted perpendicular to said path, said baffle wider in descending progression to protrude to a greater extent into the airstream at the bottom to divert the airstream in descending progression in a more forwardly direction.

14. The apparatus of claim 13 in which an actuator is provided to turn said baffle from one side of the housing to the other in response to rotation of the housing about said vertical axis.

References Cited

UNITED STATES PATENTS

| | | | |
|---|---|---|---|
| 1,536,846 | 5/1925 | Heath et al. | 230—274 |
| 2,279,425 | 4/1942 | Voysey | 230—274 |
| 2,321,792 | 6/1943 | Bowie | 239—77 |
| 2,938,672 | 5/1960 | Glatfelter | 230—274 |
| 3,319,890 | 5/1967 | Wolford | 230—114 |
| 3,252,656 | 5/1966 | Greenwood | 239—77 |

FOREIGN PATENTS 242,305  12/1962  Australia.

HENRY F. RADUAZO, Primary Examiner

U.S. Cl. X.R.

98—40; 239—78; 415—216